United States Patent
Sekido

[19]

[11] Patent Number: 6,109,910

[45] Date of Patent: *Aug. 29, 2000

[54] INJECTION MOLDING MACHINE FOR THERMOPLASTIC RESIN

[75] Inventor: Noritsugu Sekido, Gifu, Japan

[73] Assignee: Tohkai Juken Kogyo Kabushiki Kaisha, Gifu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/832,350

[22] Filed: Apr. 2, 1997

[51] Int. Cl.$^7$ ..................................................... B29C 45/56

[52] U.S. Cl. .......................... 425/561; 425/564; 425/589; 425/595

[58] Field of Search .................................... 425/555, 557, 425/561, 589, 595, 564

[56] References Cited

U.S. PATENT DOCUMENTS

| | | | |
|---|---|---|---|
| 2,938,232 | 5/1960 | Martin | 425/555 |
| 3,296,353 | 1/1967 | Nouel | 425/557 |
| 3,774,811 | 11/1973 | Stareman | 425/557 |
| 4,334,847 | 6/1982 | Schauffele | 425/557 |
| 4,342,717 | 8/1982 | Gardner | 425/555 |
| 4,389,358 | 6/1983 | Hendry | 425/558 |
| 4,519,763 | 5/1985 | Matsuda et al. | 425/555 |
| 4,557,683 | 12/1985 | Meeker et al. | 425/557 |
| 4,756,683 | 7/1988 | Svoboda | 425/557 |
| 4,904,178 | 2/1990 | Sonoda et al. | 425/557 |
| 5,011,399 | 4/1991 | Farrell | 425/557 |
| 5,380,186 | 1/1995 | Hettinga et al. | 425/557 |
| 5,639,491 | 6/1997 | Wang | 425/557 |

*Primary Examiner*—James P. Mackey
*Attorney, Agent, or Firm*—Evenson, McKeown, Edwards & Lenahan, P.L.L.C.

[57] ABSTRACT

In an injection molding machine for thermoplastic resin, a mold clamping hydraulic circuit is constituted as a hydraulic circuit which can be optionally set to a pressure-free or substantially pressure-free state upon completion of closure of a mold mounted to a clamping unit. A movable mold of the clamping unit can be retracted with a low injection pressure by injecting the molten resin via an injection unit. A nozzle port opening to a space of a mold cavity is closed simultaneously with completion of the charge of predetermined amount of resin, and a mold clamping force at a high pressure is generated on the forward side of the mold clamping unit, thereby producing mold clamping at a predetermined position. Since the mold is in a pressure-free or substantially pressure-free state, the injection pressure may also be low. Accordingly, a resin injection amount for a single shot can be increased by several times without increasing the pressure of a hydraulic cylinder of an injection unit and, further, molded articles several times in size can be molded without increasing the mold clamping force of the clamping unit.

3 Claims, 7 Drawing Sheets

INJECTION MOLDING MACHINE FOR THERMOPLASTIC RESIN

BACKGROUND OF THE INVENTION

Field of the Invention

The present invention concerns an injection molding machine for a thermoplastic resin.

In thermoplastic resin molding, an injection method has been known as a typical process for molding complicated articles of three dimensional shapes. As is well-known, in an injection molding method, a thermoplastic resin material is melted, injected at a high injection pressure ln a clamped mold and then cooled to solidify in the mold to obtain molded articles with stable dimensional accuracy and having fine appearances with no sink marks, burs and the like.

To this end, a clamping force capable of withstanding a high injection pressure is required, and a strong mold is also demanded.

Usually, irrespective of the scale of machines, an injection unit having an injection pressure of from 1200 to 2500 kg/cm2 is provided. In this case, in order to increase the injection pressure in the same machine, the screw diameter has to be reduced. Since an injection pressure and an injection capacity are in a reverse proportion to each other, a high injection pressure is required for obtaining articles of stable dimensional accuracy, and only small-sized articles can be molded at present, even when strong and relatively large molding machines are used.

The reason why such a high injection pressure is required in existing molding machines is that it is intended to utilize the resin pressure for the operation of charging a molten resin into a mold cavity serving as a heat exchanger and for the prevention of sink marks on the surfaces of molded articles.

On the other hand, since the thermoplastic molten resin is deprived of heat by the mold during injection, it has a tendency to form skin layers on both upper and rear surfaces thereof which increase its viscosity in proportion to the flowing length thereof. Accordingly, the skin layers on both upper and rear surfaces harden at the time of completion of charging of the resin into the mold cavity and the injection pressure transmitting layer is narrowed.

Therefore, a high injection pressure is further required for expanding the resin from the central layer to the outer surface in order to resist the nature of the resin of cooling→solidification→shrinkage, and avoid sink marks on the surface caused by the shrinkage from the inside of the wall thickness of the molding articles. Accordingly, only small-sized articles can be obtained as compared with clamping pressure (ton) and injection pressure (ton) of the molding machine.

As described above, since the flowing length is limited in proportion to the thickness of the molded products, pinpoint gates are required at a number of positions in large-sized molding articles even when a large scale molding machine is used.

Further, it is desired for most large-sized molding articles to have less weight and increased strength, and to not thermally expand when heated. As a countermeasure, glass fibers (1 mm–7 mm in length) have recently been used as reinforcing composite materials in the field concerned. However, in a pinpoint gate mold for molding a molten resin mixed with glass fibers to make a composite material, the gate is enlarged, since gate abrasion takes place due to the flow of the glass fibers during injection. Therefore, when the molding articles are released from the mold (mold opening operation), no satisfactory gate-tearing can be attained to cause peeling or cracking at the gate portion, often resulting in failure to obtain good molded articles.

For such reasons, a reinforcing composite material such as glass fibers that promote abrasion of molds cannot be used for molding large-sized-articles, requiring strength at reduced thickness and weight, by the use of pinpoint gates. That is, molded resin articles having a large area, reduced thickness and weight, and a large strength can not presently be obtained by injection molding.

OBJECT AND SUMMARY OF THE INVENTION

The present inventor has considered the necessity for a molding method capable of spontaneously coping with the nature of the thermoplastic resin as it is in order to overcome such situations in the prior art and, to this end, adopts the following features:

(1) When a molten resin is injected into a mold set in a pressure-free state, the mold is opened and resin supply is completed, forming a thick layer with no resistance.

(2) Molten resin, in a required amount, undergoes the effects of the temperature of a cooled mold only at a minimum area.

(3) The resin supplied as a thick layer into the mold keeps a circular shape around a gate port disposed, at a position of a central portion of the mold, as its center.

(4) The gate port is closed such that the resin does not flow backwardly from the inside of the mold cavity.

(5) By generating high pressure in the mold, the mold opened upon injection proceeds into a closed state.

(6) The entire circumferential length of the thick layer, keeping the circular shape serves as a film gate and charging is completed while enlarging the circular shape at a high speed in the mold cavity with less effect of the mold temperature in the cavity.

(7) The molten resin, having a nature of flowing, cooling, solidifying, and cooling, proceeds, upon solidification (hardening), from both of the surface and the rear face constituting the cavity of the mold. Accordingly, skin layers are formed on the surface and the rear face of the resin, so that the thermally expanded resin is shrunk toward the central layer as it is cooled.

(8) Since a clamping force at high pressure is exerted so as to spontaneously cope with the nature of the resin as it is, the resin is cooled and solidified, with no sink marks, to provide molding articles.

(9) Since the molding method spontaneously copes with the nature of the resin as it is, both the injection pressure and the clamping pressure may be reduced to $\frac{1}{5}$–$\frac{1}{7}$ of previous values, and this molding method can provide articles 5 to 7 times as large as conventional injection molding machines by using a gate disposed at a point in the central portion of the articles.

However, 80 to 90% of customarily used injection molding machines have horizontal clamping mechanisms. In this case, since the movable part is retracted laterally by the injection pressure, the parting face of the mold mounted to the clamping unit has less resistance and is opened more than necessary from a retainer part, and the weight of the molten resin injected from the sprue gate at a center portion of the molded article causes a vertical difference in the flowing direction. Since this leads to molding failure, it is necessary for the resin to flow uniformly in both the vertical and lateral directions with respect to the gate as a center to keep a circular shape. Therefore, it requires a hydraulic pressure circuit capable of setting a pressure to generate a back pressure that can prevent the flow difference instead of the pressure free state simultaneously with the completion of the mold closure. Molding for the articles is conducted by the operations from (1) to (8) described above.

A conventional injection molding machine uses a hydraulic pressure circuit that generates a clamping force at a high pressure upon completion of the mold closure, and the mold is locked by the pressure. Since there are various kinds of means for constituting the hydraulic pressure circuits in the present invention, it will be explained, in this application, as including a direction switching valve and a flow rate control valve (restriction valve). Since the molding method is as described above, an injection pressure 1/7 to 1/8 of that in the prior art may suffice. Accordingly, in an inline screw injection mechanism, the screw stroke equipped to the injection mechanism can be utilized while enlarging the diameter only for the screw head portion structure. The heating cylinder head is secured to the heating cylinder.

Further, in a preplasticating injection unit, molten resin can be metered and injected in an amount several times as large as the faculty of the molding machine by using a resin plasticating screw as it is and enlarging the diameter of an injection plunger. Further, the nozzle is closed at the same time with the completion of the molten resin injection in the mold, the screw is rotated and the melting→kneading→charging to the metering section of the resin are conducted during the cooling period of the molded articles. This can greatly contribute to shortening of the molding cycle.

When even larger molded articles are required, an injection unit invented by the present inventor and utilizing an extruder can be used for obtaining a large injection capacitance, stable kneading and injection at a stable melting temperature even when coarsely pulverized material of recycled resin material is mixed at a large ratio with virgin resin material. The invention can include:

(a) A large capacity injection unit utilizing an extruder.
(b) An increased capacity injection unit obtained by modifying an inline screw type injection unit.
(c) An increased capacity injection unit obtained by modifying an injection plunger into a larger diameter in the preplasticating injection unit.

The injection compression molding machine in the present invention can be attained by combining each of the three kinds of units with the clamping unit having the hydraulic circuit as described above. Constitutions and advantageous effects will be described in detail by way of preferred embodiments.

DETAILED DESCRIPTION OF THE PREFERRED EMBODIMENTS

First Embodiment

Figure 1:
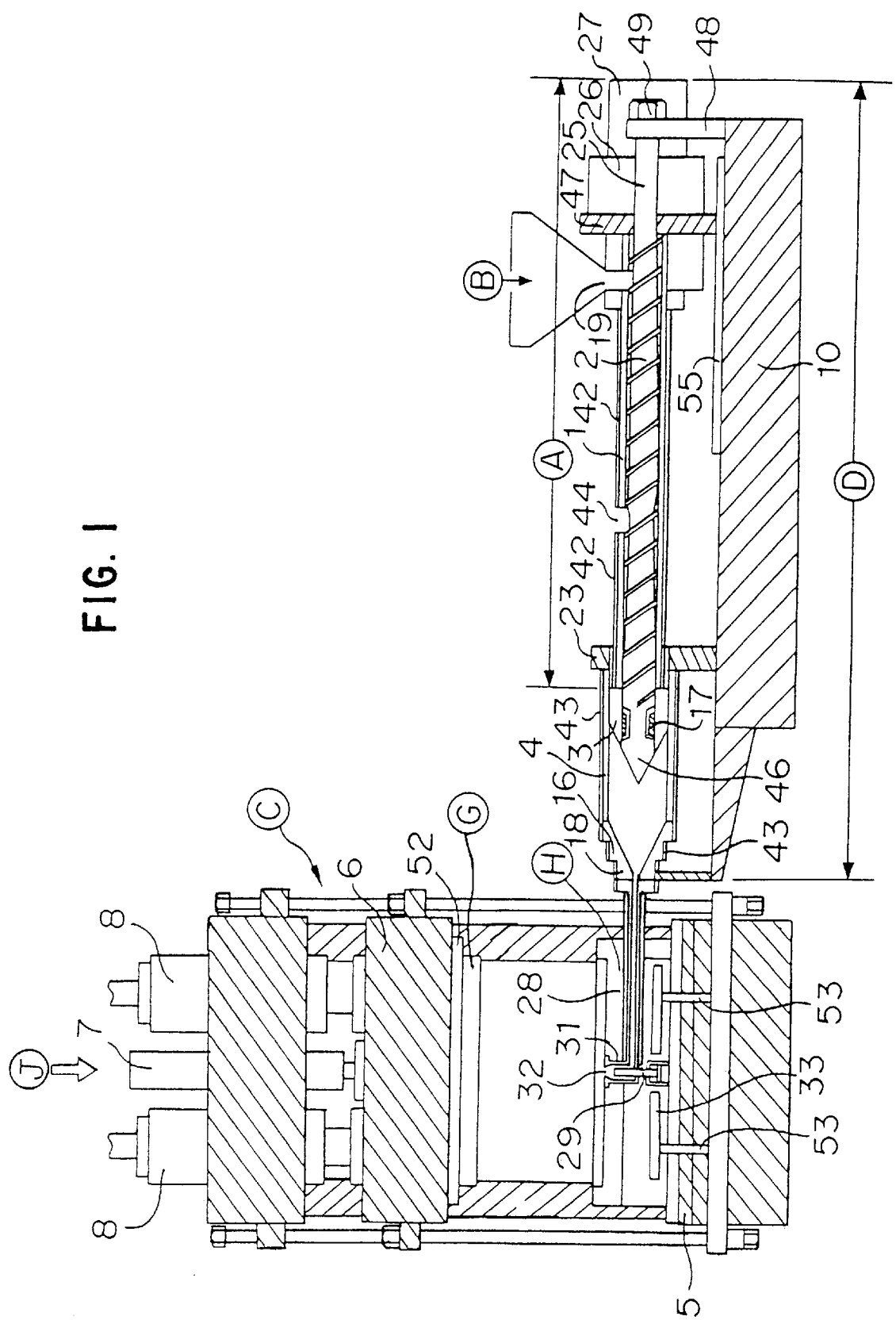
FIG. 1 is a side elevational cross sectional view of an injection compression molding machine illustrating a first embodiment comprising, in combination, a large capacity injection unit D utilizing an extruder A and a vertical type clamping mechanism.
Figure 2:
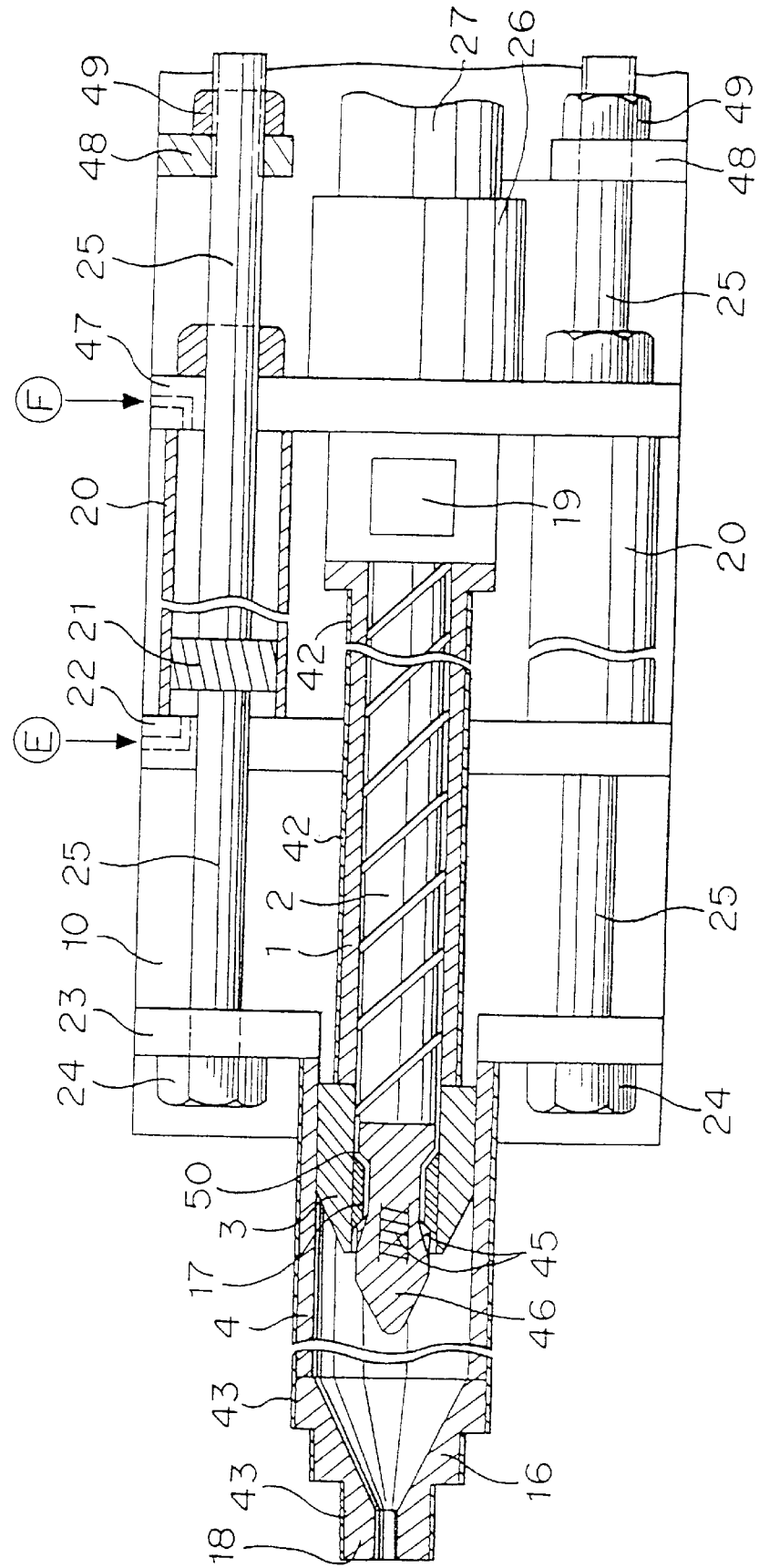
FIG. 2 is a horizontal cross portion of a large capacity injection unit D utilizing the extruder A in FIG. 1.
Figure 3:
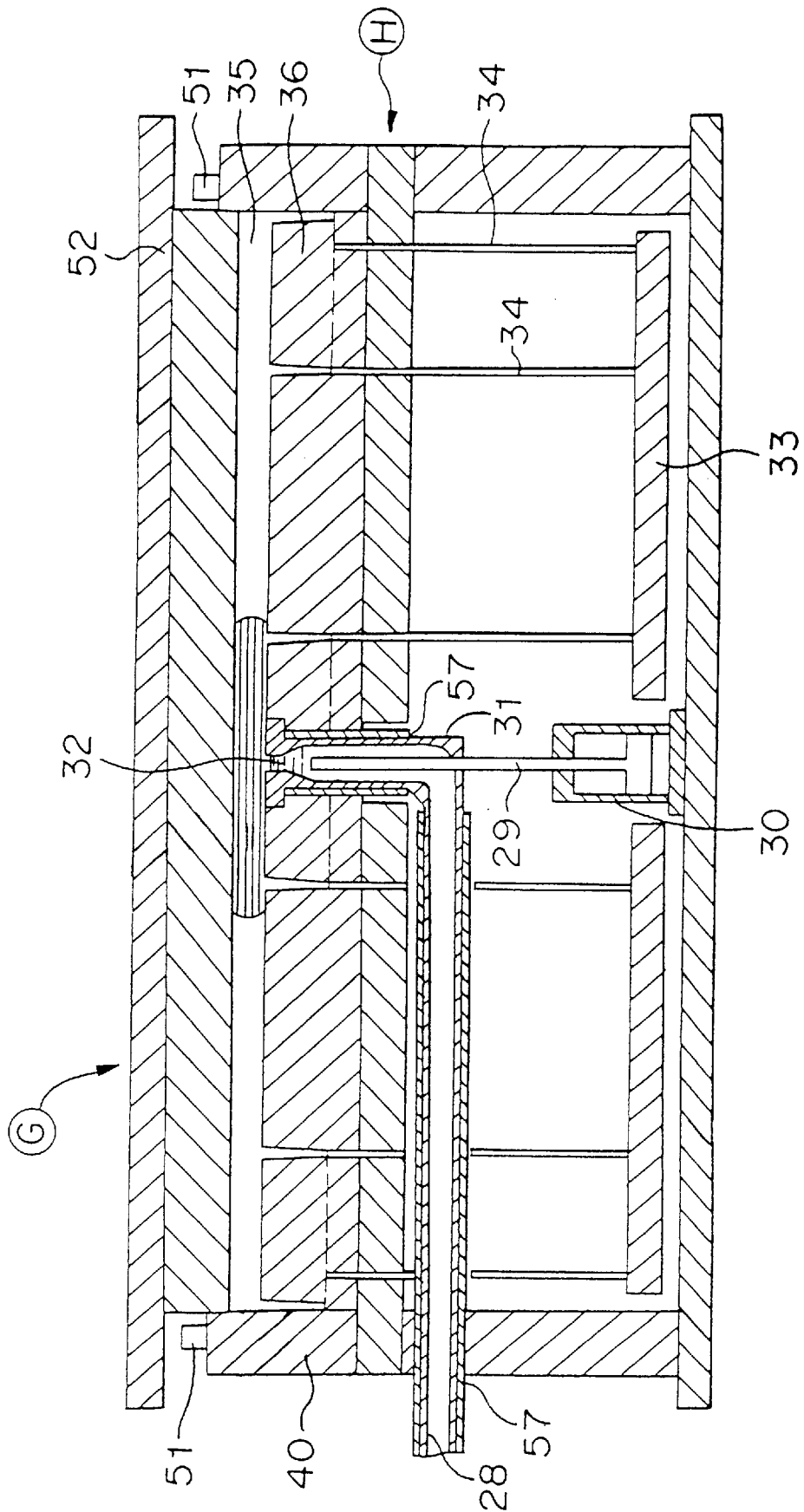
FIG. 3 is a vertical cross sectional view for a pamphlet mold for fork lift for molding being mounted to a vertical type clamping unit C.
Figure 7:
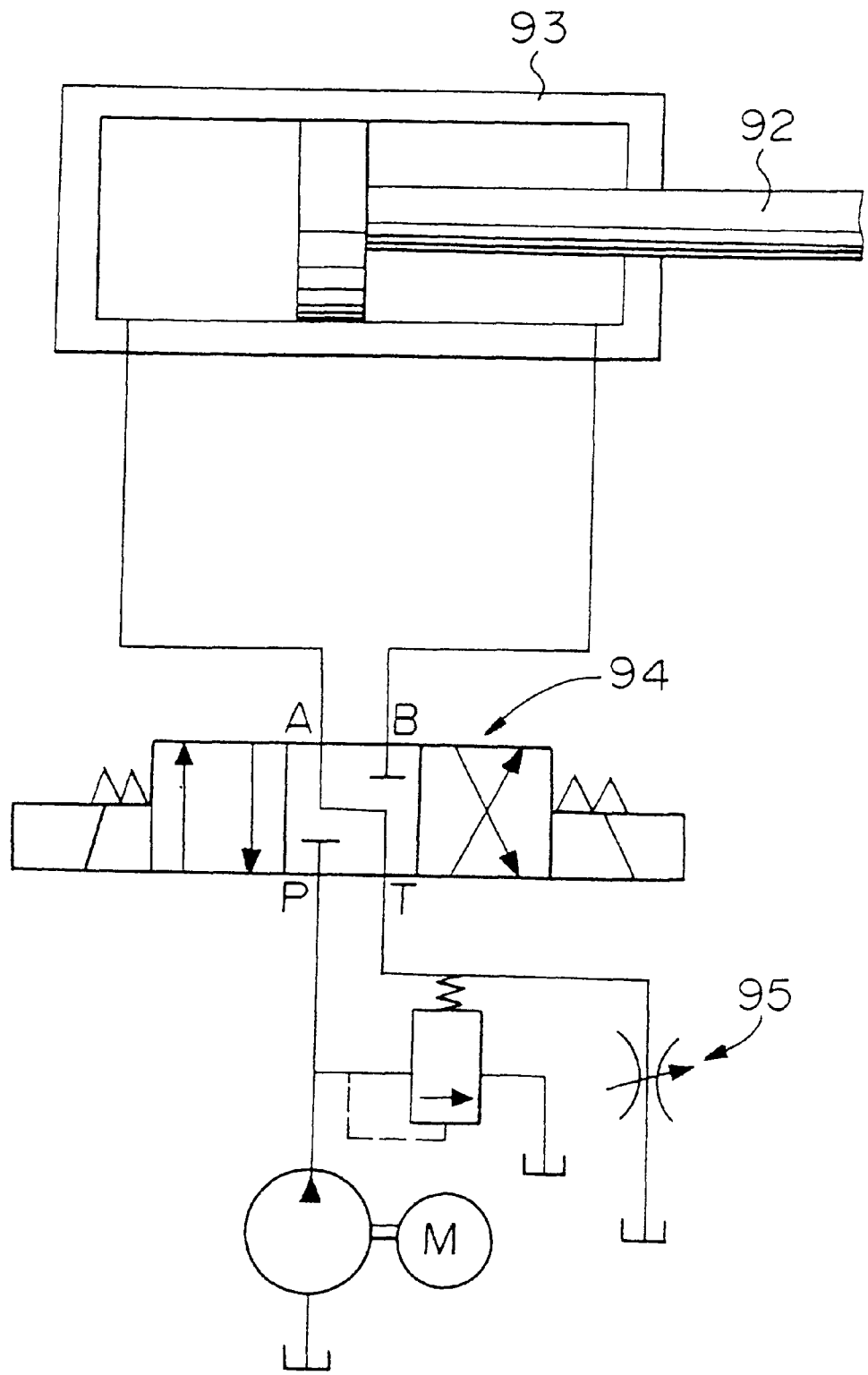
FIG. 7 is an example of a hydraulic circuit used in a clamping machine according to the present invention.

FIG. 1 is a side elevational cross sectional view of an injection compression molding machine, comprising a large capacity injection unit D utilizing an extruder A and a vertical type clamping unit C in combination, illustrating a first embodiment according to the present invention, FIG. 2 is a horizontal cross sectional view for a portion of the large capacity injection unit D utilizing the extruder A, FIG. 3 is a vertical cross sectional view of a pamphlet mold used for a forklift for conducting molding by being mounted to the vertical clamping unit C, and FIG. 7 shows a hydraulic circuit diagram comprising a combination of a direction switching valve and a restriction valve as an example of a hydraulic pressure circuit used for the clamping unit in the present invention.

At first, a lower mold H in FIG. 3 is secured on a retainer platen 5 of a clamping unit C in FIG. 1, while an upper mold G is mounted and secured to a clamping movable platen 6. Then, a hydraulic cylinder 7 of a small diameter vertically moves the movable platen 6 by a hydraulic pressure cylinder 7 of a small diameter. The hydraulic cylinder 7 comprises a hydraulic circuit as shown in FIG. 7. The upper mold G moves downward by downward operation of the cylinders and fits to the lower mold H to complete mold closure, in which the clamping hydraulic circuit is set as a low pressure circuit in a pressure-free or substantially pressure-free state. In FIG. 7, reference numeral 92 denotes a piston rod for a clamping cylinder 93, 94 denotes a direction switching valve for a clamping forward hydraulic circuit and 9S denotes a restriction valve. Then, a top end 18 of a cylinder head 16 in an injection cylinder 4 is connected with a resin channel 28 in the mold, a nozzle 31 is connected with the top end thereof and a nozzle opening 32 is opened to the upper surface of the lower mold H. The nozzle port 32 is made closable and openable by the rod valve 29 by the vertical operation of a hydraulic cylinder 30 (air pressure may be used). Further, the injection cylinder 4, the cylinder head 16, the resin channel 28 and the nozzle 31 are connected to each of the heaters 43 and 57 respectively and kept at a set temperature. Further, a cooling water circuit (not illustrated) is disposed at the periphery of the nozzle port 32. Then, since the screw 2 is rotated by the driving force of the motor 27 by way of a bearing box 26, and the heating cylinder 1 is elevated to a set temperature by the band heater 42 wound around the outer circumference of the heating cylinder 1, the thermoplastic resin material stored in the hopper B attached to the upper portion of the hopper port 19 is melted while being transported in the direction of the injection cylinder 4 by the rotation of the screw 2, removed with moisture water content or the like contained in the recycling material by gasification upon passage at the position of the bent port 44 and, further, charged into the injection cylinder 4 while passing a groove 45 fabricated to the screw head 46 while being transported and kneaded.

In the piston 3 secured to the top end of the heating cylinder 1, the screw 2 and the screw head 46 are retracted together with the piston 3 from the injection cylinder head 16 by the charging pressure of the molten resin. Then, when they retract to a position set for the required amount of the resin, a signal is actuated to stop the rotation of the screw 2.

Then, a shaft 25 is inserted into a fixing plate 23 of the injection cylinder 4 fixed to the upper surface of a bed 10 in the injection unit, and into a shaft fixing plate 48 fixed to an upper surface of the bed 10 and then fixed by a nut 49 and a nut 24. Both ends of a hydraulic cylinder 20 are fixed by the extruder fixing plate 47 and the heating cylinder retainer plate 22 having the shaft 25 inserted therethrough, and a hydraulic piston 21 is inserted and fixed to the shaft 25 in the hydraulic cylinder 20. The hydraulic cylinder 20 is made slidable relative to the shaft 25 and the hydraulic piston 21. In the heating cylinder retainer plate 22 and the extruder fixing plate 47, an injection forward circuit E and an injection backward circuit F are in communication as a hydraulic circuit connection port to two right and left hydraulic pressure cylinders 20. When the upper mold G secured to the movable plate 6 of the clamping unit C lowers and fits the lower mold H to receive a mold closure complete signal, the nozzle rod valve 29 closed so far lowers instantly to open the nozzle port 32 and, at the same time, supply a high pressure oil from the circuit E whereby injection forwarding is started. The molten resin charged in the injection cylinder 4 is in communication with the injection cylinder head 16 and the resin channel 28 and, further, connected as far as the nozzle port 32, so that the resin is injected into the mold cavity 35, and the upper mold G starts to raise under the effect of the injection pressure.

When injection is started, a resistive force is generated in the molten resin in the injection cylinder 4, which creates a repulsing action to retract a back flow preventive ring 17, incorporated in the screw head 46 and abutting against a valve seat 50 thereof, to prevent the molten resin from flowing back into the screw 2, so that the injection amount in every cycle is made constant. Then, the upper mold G is raised by the pressure of the injected resin and, simultaneously with the completion of the injection, the rod valve 29 ascends to close the nozzle port 32, a high pressure oil is supplied to a large diameter hydraulic cylinder 8 of the clamping unit C to proceed with clamping, in which the upper retainer plate 52 of the mold abuts against a stopper 51 disposed on the wall 40 of the lower mold H, and molding articles are cooled to a predetermined thickness and finished.

On the other hand, simultaneously with the closure of the nozzle port 32, the screw 2 starts to rotate and molten resin is charged to greatly contribute to the next cycle. Then, mold opening is conducted by the small diameter cylinder 7 by a cooling period end signal, in which an ejector rod 53 disposed on the clamping unit is elevated to push up an ejector plate 33 of the mold, and the molded article is pushed up from the lower mold by ejector pins 34 to take out the molded article. In this way, even when a molded article has an area of 1500 mm×1500 mm, the article is formed with no sink marks, with no orientation distortion, at high accuracy and with a fine surface injection port at one position of the central area.

Second Embodiment

Figure 4:
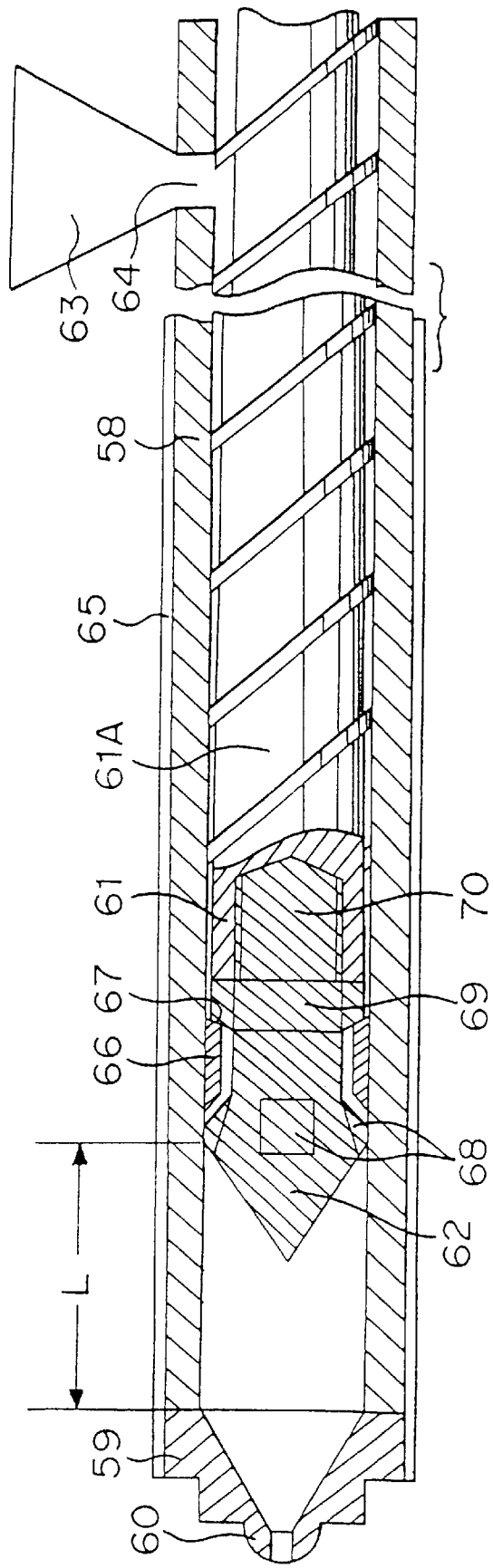
FIG. 4 is a vertical cross sectional view of an injection unit set in an inline mode to a lateral type clamping mechanism of a conventional injection molding machine.

FIG. 4 is a vertical cross sectional view of an injection unit which is set inclined to a horizontal clamping unit of a conventional injection molding machine, in which are shown, in a cross section, a heating cylinder 58, a cylinder head 59, a nozzle 60, a screw top end 61, a screw head 62, a hopper 63, a hopper port 64, a heating band heater 65 and a back flow preventive ring 66. Then, the resin material stored in the hopper 63 is transported from the hopper port 64 by the rotation of the screw 61A in the heated heating cylinder 58, put to melting and kneading as it approaches the screw head 62, passes through the outer diameter portion of a seat valve 69 inserted in the screw head 62, and passes through the inner diameter side of the back flow check ring valve 66. The molten resin is then charged, passing through a groove 68 disposed at the top end of the screw head 62 and into the inside of the cylinder head 59. In this case, the back flow preventive ring valve 66 goes ahead of a seat face 67 of the seat valve 69 by the transporting pressure of the molten resin to form a molten resin channel. L denotes a stroke in which the molten resin is charged for the entire stroke of the injection unit. Then, the nozzle 60 is in press contact with a sprue port disposed on the cavity side of the mold set to the lateral clamping unit (not illustrated) such that the resin does not leak by the injection pressure. The back flow preventive ring 66 abuts against the seat face 67 of the seat valve 69 by the pressure of the molten resin in the heating cylinder by the forwarding operation of the screw 61A by an injection start signal, by which the resin is injected into the mold with a stable injection amount on every cycle.

Figure 5:
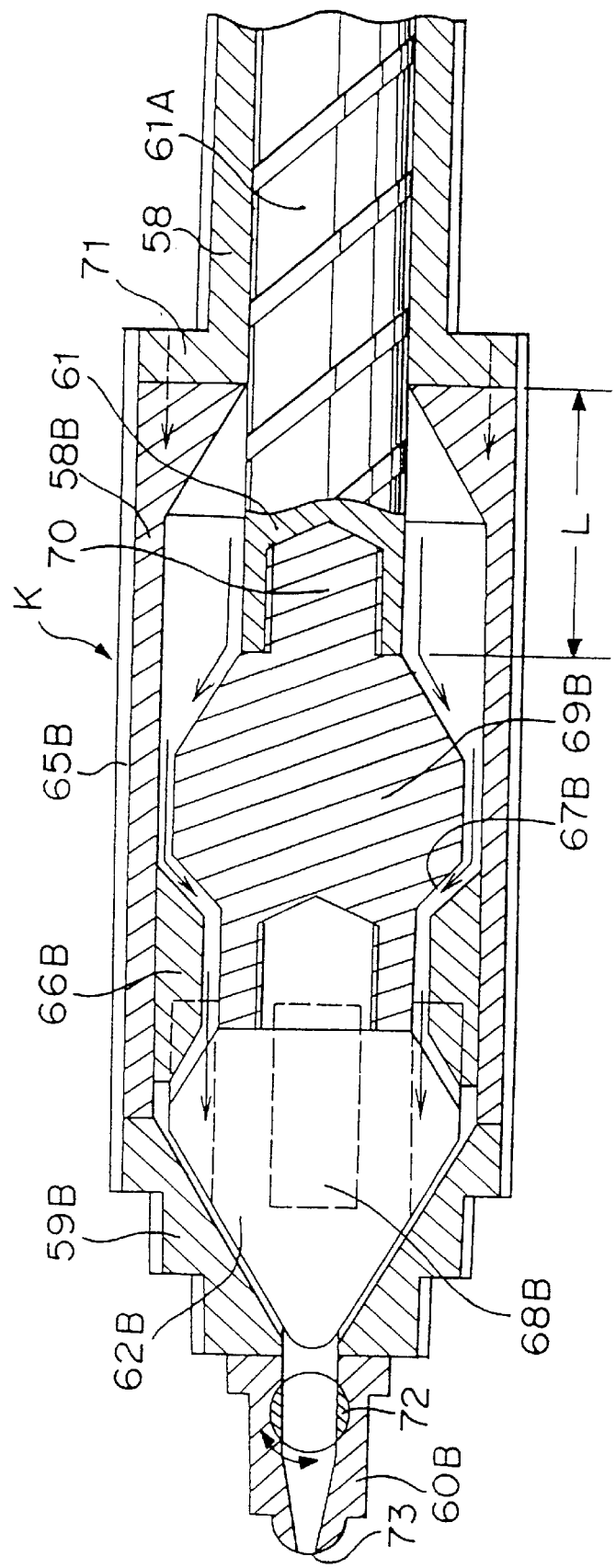
FIG. 5 is a vertical cross sectional view injection unit illustrating a second embodiment of the present invention.

FIG. 5 shows a second embodiment according to the present invention in which a screw head 62 B has an identical structure with the screw head 62 shown in FIG. 4 except that only the outer diameter is made twice as large as the screw head 62. A screw 61A is identical with the screw 61A of FIG. 4, and a thread assembly portion 70 of a screw head 62B has an identical thread size. The top end of a heating cylinder 58 is made into a large diameter 71, and they are inserted and assembled with a large diameter screw head assembly thread 70 in the cylinder 58B having the twice inner diameter of the heating cylinder 58 and enabling an identical stroke L with that in FIG. 4.

Then, a large size cylinder head 59B is fixed to the top end of the injection cylinder 58B made of a larger diameter, and a band heater 65B is attached to the outer circumferences thereof. Then, a rod valve 72 capable of opening and closing is disposed to the nozzle 60B.

Thus, an injection unit having four times volume is provided by a unit K including the injection cylinder 58b having an inner diameter twice as large as the conventional injection cylinder 58. Chained arrows shown at the inside of the unit K show the stream of the molten resin transported from the screw 61A. In FIG. 5, the screw head 62B is shown at a position starting to charge the resin to the injection cylinder head 59B by the rotation of the screw 61A and the operation is identical with that explained for FIG. 4.

Then, the lateral type clamping unit having the hydraulic circuit described above and an injection unit shown in FIG. 5 are combined as an inline made to constitute an injection molding machine, in which a nozzle port 73 is in press contact with a sprue gate port disposed at the center of the mold set to the lateral clamping unit. Simultaneously with the completion of the injection for the required amount of the molten resin in the order as described for FIG. 4, the resin channel in the nozzle 60B is closed by a rotatable rod valve 72 and compression molding is conducted by an intense mold clamping pressure of the clamping forward operation (clamping pressure of the injection molding machine provided with the injection unit shown in FIG. 4). Therefore, simultaneously with closure of the nozzle 60B channel by the rod valve 72, the screw 61A starts rotation thereby enabling the resin to conduct melting→kneading→charging. This operation is continued even during cooling period in the conventional machine, so that articles having several times of volume can be molded at high cycle as the feature of this molding machine. By the way, since it is required in the conventional molding machine to inject the molten resin in the mold clamped at a high pressure for forming the injection pressure not causing sink marks during flowing→charging→cooling→solidification in the mold by the injection pressure, therefore, the screw 61A can not be rotated until the completion of such period. Further, an opening/closing valve is sometimes disposed in the nozzle, but this is different from the purpose of using such a nozzle port opening/closing valve in the conventional machine. Namely, in a case of molding a nylon resin, the nylon resin at the nozzle port forms a shape of a suspended yarn while being attached to the sprue upon opening the mold, and the molded article is taken out upon completion of the cooling time due to the nature of the nylon resin. Then, the molded article does not fall but is suspended and, in a case of automatic molding, the suspended molded article is crushed by the clamping in the next cycle to often damage the mold. In view of the above, with an aim of improving the yarn disconnection, the valve is opened by the injection pressure to retract the nozzle and the injection unit abutted against the mold upon completion of the cooling period and the valve is closed by the resiliency of the spring so that the molten resin does not leak through the nozzle port during charging of the molten resin by the rotation of the screw 61A. Then when the mold clamping is completed, the entire injection unit proceeds such that the nozzle 60 is in press contact with the mold sprue port to start injection in this molding method.

Third Embodiment

Figure 6:
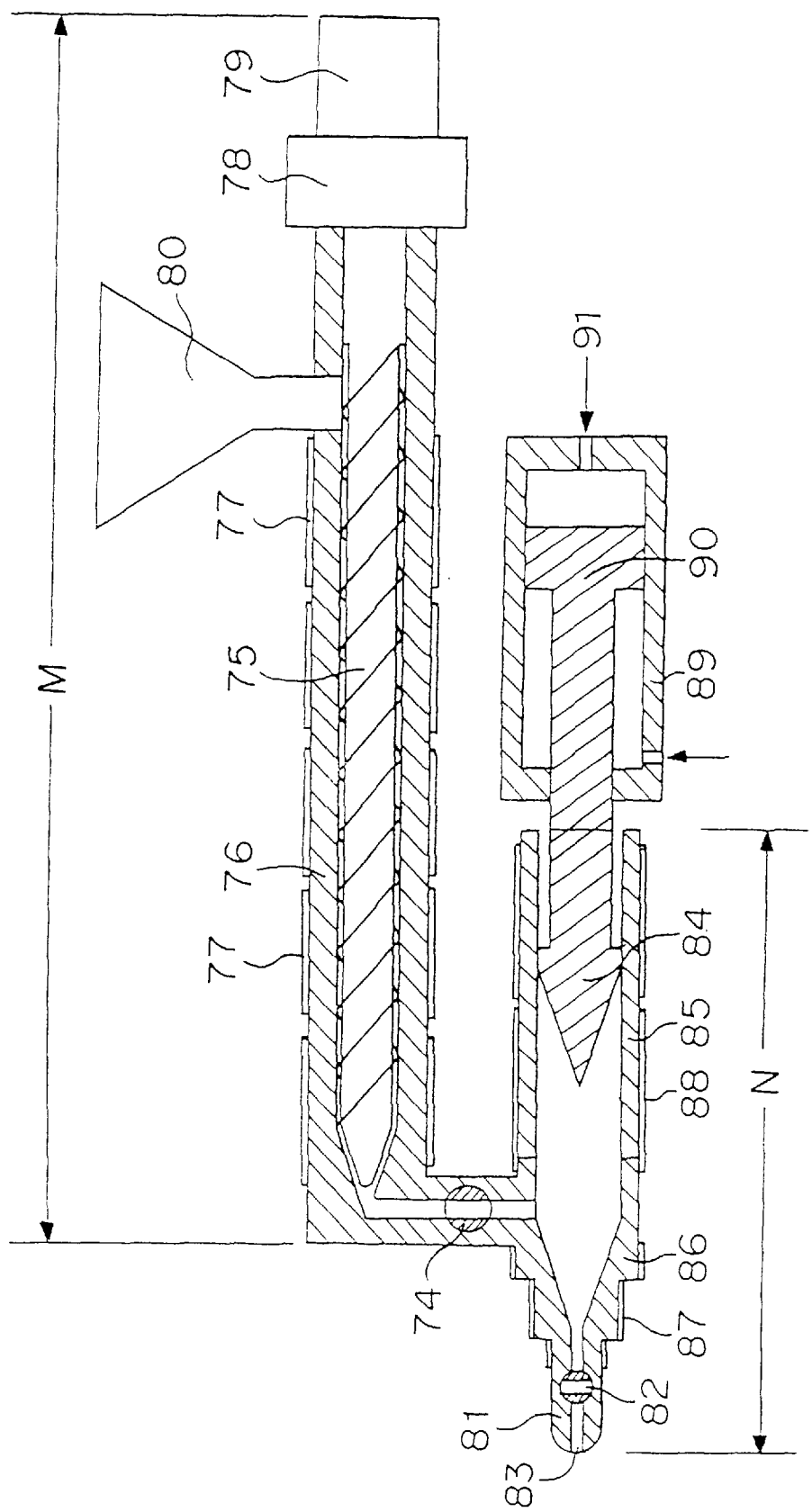
FIG. 6 is a vertical cross sectional view of a third embodiment in which an injection unit N is disposed in an inline mode to a horizontal type clamping unit and an extruder M is connected in parallel or at an inclined angle with an upper portion or left or right side thereof.

FIG. 6 is a vertical cross sectional view in which an injection unit N is disposed in inline with a lateral type clamping unit (not illustrated), and an extruder M is connected in parallel with or at an inclined angle on both right and left sides thereof. A valve check valve or rod valve 74 for opening and closing the molten resin channel is disposed at a connection portion. A resin material stored in a hopper 80 is transported in the heating cylinder 76 by the rotation of a screw 75 inserted in a heating cylinder 76 heated to a set temperature by a band heater 77. The resin, melted and kneaded while it is transported to the top end of the screw 75, is transported into the injection cylinder head 86 of the injection unit N since the rod valve 74 is opened. An injection plunger 84 is retracted to the pressure of the resin. When it is retracted to the predetermined position, the screw 75 stops rotation by a related signal. Simultaneously, connection channel is closed by the rod valve 74 and the injection plunger 84 starts injection by the supply of a high pressure oil from the hydraulic ram inserted in a hydraulic cylinder 89 connected to the rear end portion of the plunger, through an injection forward oil pressure circuit port 91. The molten resin is charged in the mold cavity through the sprue into the mold locked by the mold clamping force at high pressure and the injection pressure is applied as it is until the molten resin is charged in the mold cavity passing the sprue in the mold and cooling is completed. In this regard, the molding process is identical with that described for the second embodiment. In FIG. 6, a rotary rod valve 82 capable of opening and closing is disposed additionally to the nozzle 81 of the injection section N of the preplastication injection unit and, further, the inner diameter of the injection cylinder 85 and the injection cylinder head 86 are made larger. Then, the injection plunger 84 inserted therein has such an outer diameter size and the structure such that the molten resin is not leaked externally during injection (details are not shown). The figure illustrates the state that the molten resin is completely charged by a required amount. Then, the screw 75 is stopped by a metering completion signal and, further, the channel is closed by the rotary rod valve 74 at the connection portion thereby closing the rotary rod valve 82 of the closed nozzle 81 to open the nozzle port 83, and a high pressure oil is supplied from the oil supply port 91 of the hydraulic cylinder 89, so that the injection plunger 84 connected with the hydraulic ram 90 proceeds and the molten resin is charged into the mold cavity from the nozzle port 83 passing through the sprue of the mold into the cavity. In the set and closed mold in the clamping unit having the hydraulic pressure circuit as described above, the movable platen is retracted by the effect of the injection pressure and the parting surface of the mold opens slightly with less resistivity. On the other hand, the nozzle port 83 is closed by the rod valve 82 upon completion of charging and a high pressure oil is supplied by the signal to the clamping forward oil pressure circuit to generate a clamping force and conduct molding and the resin is cooled to obtain molded articles. On the other hand, simultaneously with the closure of the nozzle port 83 by the rod valve 82, the rod valve 74 at the connection portion is moved to open the channel and rotate the screw 75, and send the resin into the cylinder 85 while conducting transportation→melting→kneading of the resin in the hopper 80. Then, by enlarging the inner diameter of the injection cylinder 85, for example twice, four times the injection amount can accumulated. If a large capacity of resin amount is required, the screw 75 is rotated over the total period cooling time of the articles in the mold (+) mold opening operation (+) article recovery (+) completion of mold closure by the screw 75 itself of the conventional machine and the molten resin can be charged in the injection cylinder 85, by which the injection unit has a great feature of contributing to the high cycle. Rapid charging can be attained by a low injection pressure ($\frac{1}{5}$–$\frac{1}{8}$ of the conventional injection pressure) by the clamping unit provided with the hydraulic circuit. Further, even if the resin shrinks in the course of cooling and solidification, compression pressure exerts following after the direction. Accordingly, even the molded articles are large, articles having no sink marks, with no orientation distortion at high accuracy and having fine surfaces can be obtained.

By the way, in conventional injection molding machines, the pressure of the injection hydraulic cylinder is from 18 to 20 tons in the molding machine having a clamping force of 100 ton. The explanation has been made based on the comparison with the conventional injection molding machine. Speaking briefly, the present invention operates to charge the cavity and eliminate sink marks by utilizing the clamping force of 100 tons, and the injection unit enables four times an injection amount by doubling the diameter at the injection section of the molding machine, with the injection pressure being reduced to $\frac{1}{4}$. In the present invention, the injection unit serves only for melting and kneading of the resin and supply of the resin into the mold, while the charging to the mold cavity and prevention of sink marks are given by the mold clamping force. As a matter of fact, this molding machine can conduct molding for large size articles requiring several times of resin amount. For this, it is of course required to provide a tie bar distance capable of mounting the mold for molding large sized articles and a stroke for opening and closing the mold capable of taking out the molded articles and requires a mold clamping unit having a clamping force of 100 tons. However, the rotational members as the driving force (electric motor, hydraulic motor, etc.) and hydraulic equipment components used for the hydraulic circuit can conduct control for the flow rate and pressure like that in the conventional machine.

Further, most of molded articles can be attained with molds designed to be used for conventional injection molding, but those molds possibly causing flash by the backward movement of the movable part during injection can be used for molding without changing the design for the molded articles by partially changing the design for the mold.

Further, it is also possible to easily obtain a mold capable of molding even those articles that can not be molded unless a split mold is used, or those articles formed by plurality on the basis of the concept of molding by the clamping pressure. Further, in the conventional molding method, it was difficult to mold articles with hinges (portions for making extremely thin linear concave portions bendable like that hinge). However, according to the molding method of the present invention, since the compression molding method is conducted while flowing and charging the molten resin into the cavity, even molded articles with long hinge portions or having a number of hinges can be molded easily. Then, large box-like articles can be simply assembled being bent on the nges. The mold may be of a simple structure such as with a planer developed view, and this molding method provides great advantages, such as remarkably economizing transportation cost, packaging cost and storing cost in the industrial field.

APPENDIX II

What is claimed is:

1. An injection molding machine for a thermoplastic resin comprising:

upper and lower molds which fit together to complete a mold closure, at least one of the molds being a movable mold, a clamping hydraulic circuit including a direction switching valve which is switched to a neutral position upon completion of said mold closure, a clamping cylinder comprising a forward oil supply port which is connected with a drain when said switching valve is switched to said neutral position so that the clamping hydraulic circuit is set to a substantially pressure-free state, an injection unit from which a molten resin is injected into a mold cavity defined between the upper and lower molds thereby providing a resin pressure retracting the movable mold, a nozzle provided between said injection unit and said mold cavity and having a nozzle port opening to said mold cavity, said nozzle port being closed simultaneously with completion of injection of a predetermined amount of the molten resin into the mold cavity, a control means to open said nozzle at a mold closure complete signal, to infect molten resin into said mold cavity from an injection cylinder of said injection unit that stores said molten resin, and also to charge said molten resin into said injection unit for the next process step upon completion of nozzle closure by said injection unit, wherein the switching valve is switched from the neutral position into another position so as to generate a high mold clamping force and conduct molding upon completion of said injection of said predetermined amount of molten resin.

2. An injection molding machine for a thermoplastic resin as defined in claim 1, and further comprising an extruder having a screw which displaces the molten resin, a heater surrounding said extruder which heats the resin, a backflow preventive device disposed between a head at one end of said screw and an injection cylinder forming part of said injection unit, and a piston within said injection cylinder having an outer diameter larger than the extruder, said heater being disposed on an outer circumference of the extruder, said injection cylinder having an inner diameter corresponding to said outer diameter of said piston and enabling said piston to undergo a required stroke for injection of said molten resin into said mold cavity.

3. An injection molding machine for a thermoplastic resin as defined in claim 1, and further comprising an extruder having a screw which displaces the molten resin, an injection cylinder, forming part of said injection unit, within which a head of said screw can be displaced, and an opening/closing valve disposed so as to open and close the nozzle port, wherein the screw is aligned with said injection cylinder, said injection cylinder has a diameter larger than said extruder and includes a cylinder head in which the screw head is inserted during injection of said molten resin.

* * * * *